Dec. 12, 1939.    A. R. THOMAS    2,182,997
REFRIGERATION
Original Filed Feb. 19, 1937    4 Sheets-Sheet 1

INVENTOR.
Albert R. Thomas
BY
Ed Fernander
his ATTORNEY.

Dec. 12, 1939.　　A. R. THOMAS　　2,182,997
REFRIGERATION
Original Filed Feb. 19, 1937　　4 Sheets-Sheet 3

INVENTOR.
Albert R. Thomas
BY
E. A. Fenender
his ATTORNEY.

Dec. 12, 1939.  A. R. THOMAS  2,182,997
REFRIGERATION
Original Filed Feb. 19, 1937   4 Sheets-Sheet 4
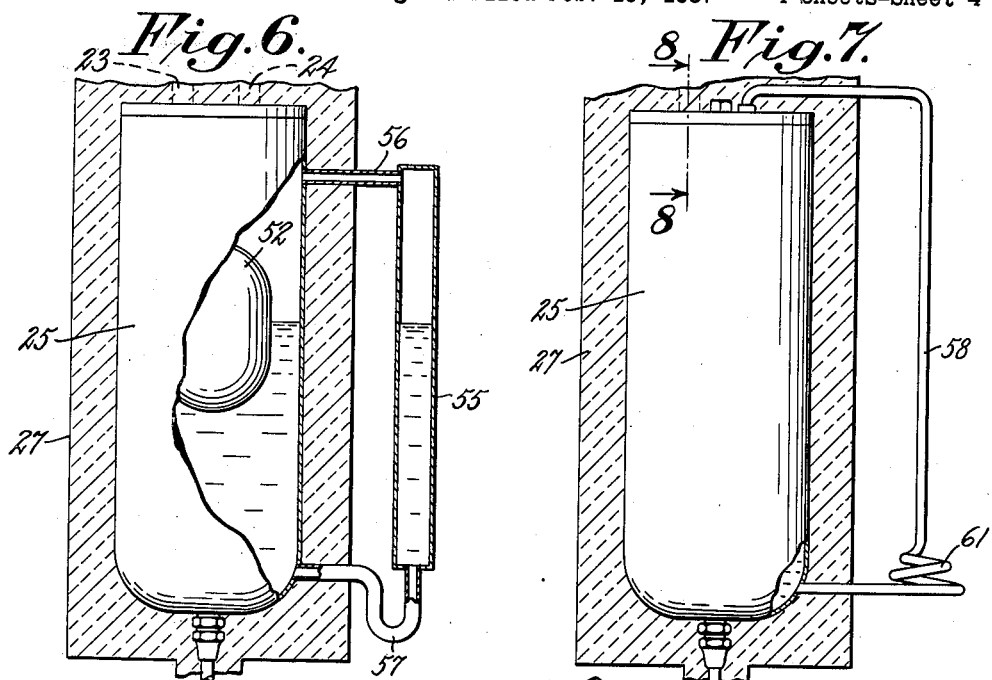
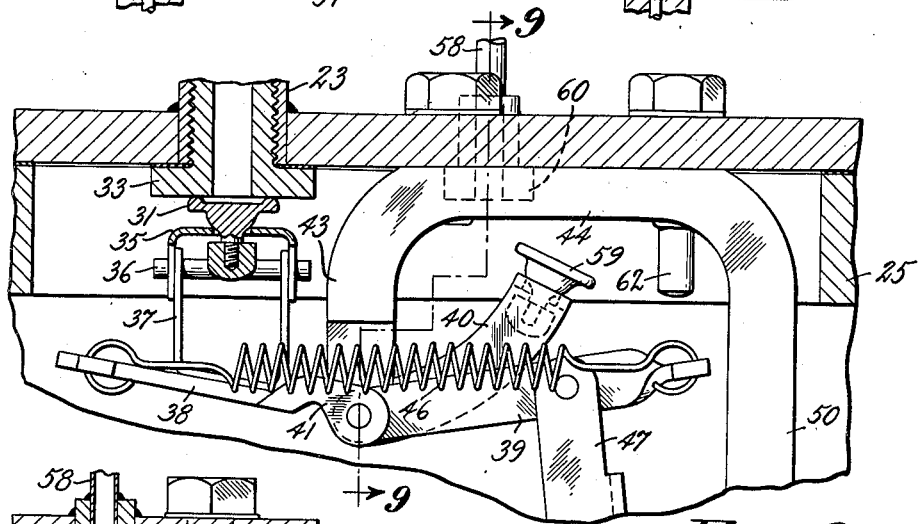
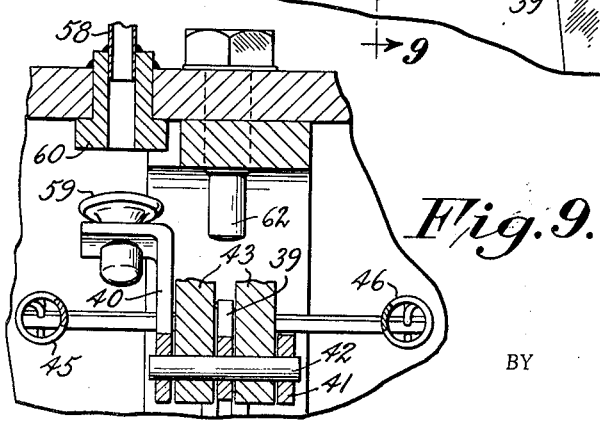
INVENTOR.
Albert R. Thomas
BY E A Fenander
his ATTORNEY.

Patented Dec. 12, 1939

2,182,997

UNITED STATES PATENT OFFICE 2,182,997

REFRIGERATION

Albert R. Thomas, Evansville, Ind., assignor to Servel, Inc., New York, N. Y., a corporation of New York Application February 19, 1937, Serial No. 126,599
Renewed May 2, 1939

17 Claims. (Cl. 62—119.5)

My invention relates to refrigeration, and has as an object the provision of an improved system for transferring heat so that cooling may be effectively produced at a place above a source of refrigeration.

In my co-pending application Serial No. 126,598, filed February 19, 1937, I have shown and described a heat transfer system containing a volatile fluid which is evaporated at a first level and condensed at a lower level, the condensed fluid being returned from the lower level to the first level by producing a liquid column of the condensed fluid, and evaporating liquid to form a body of vapor acting against the liquid column to force liquid upwardly to the first level. In said application the liquid column of condensed fluid is produced in a vessel and a rising conduit connected to the lower part of the vessel, and liquid in the vessel evaporates due to surrounding warmer air which may be at ordinary room temperature.

In accordance with this invention, I maintain the liquid column below the evaporating temperature of the fluid and produce a second body of condensed fluid, and utilize vapor formed at the second body rather than at the liquid column to force liquid upwardly to the first level. I preferably accomplish this by insulating the vessel in which the liquid column is produced and provide a part which communicates with the vessel and is disposed outside the insulation, the vessel and part being so constructed and arranged that liquid enters the part and is capable of evaporating due to heating thereof to form vapor in the vessel which acts against the liquid column to return liquid to the evaporator.

The objects and advantages of my invention will become apparent from the following description and accompanying drawings, and the features of novelty which characterize my invention are pointed out with particularity in the claims which form a part of this specification.

Figure 1:
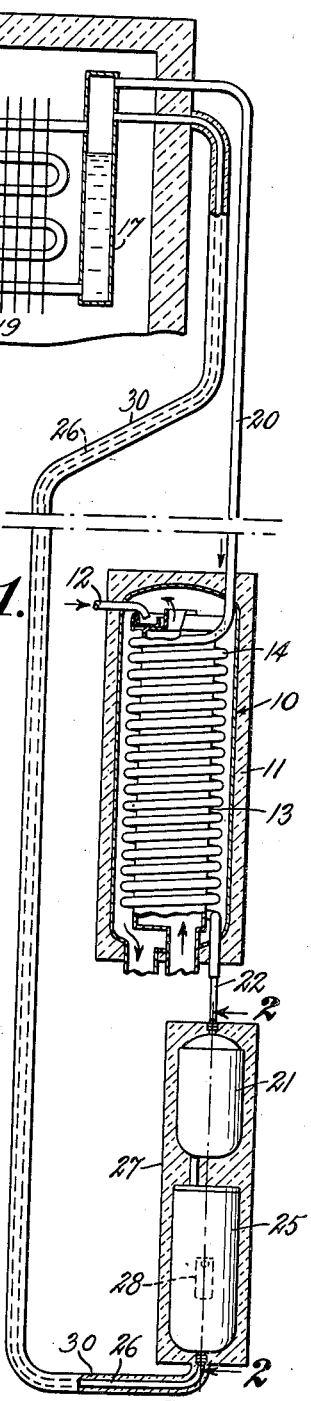
Figure 2:
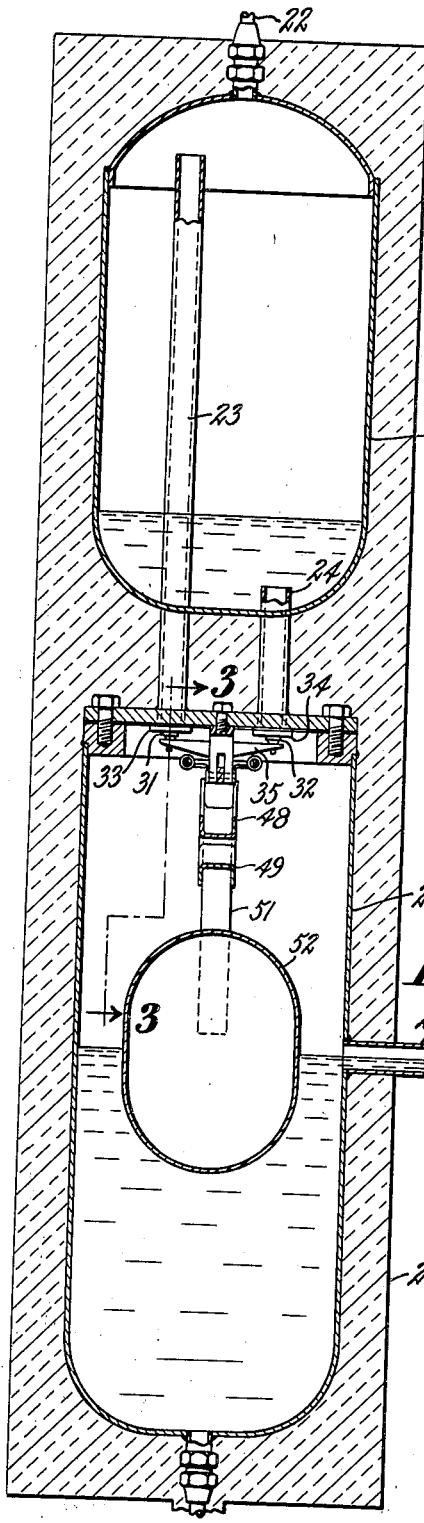
Figure 3:
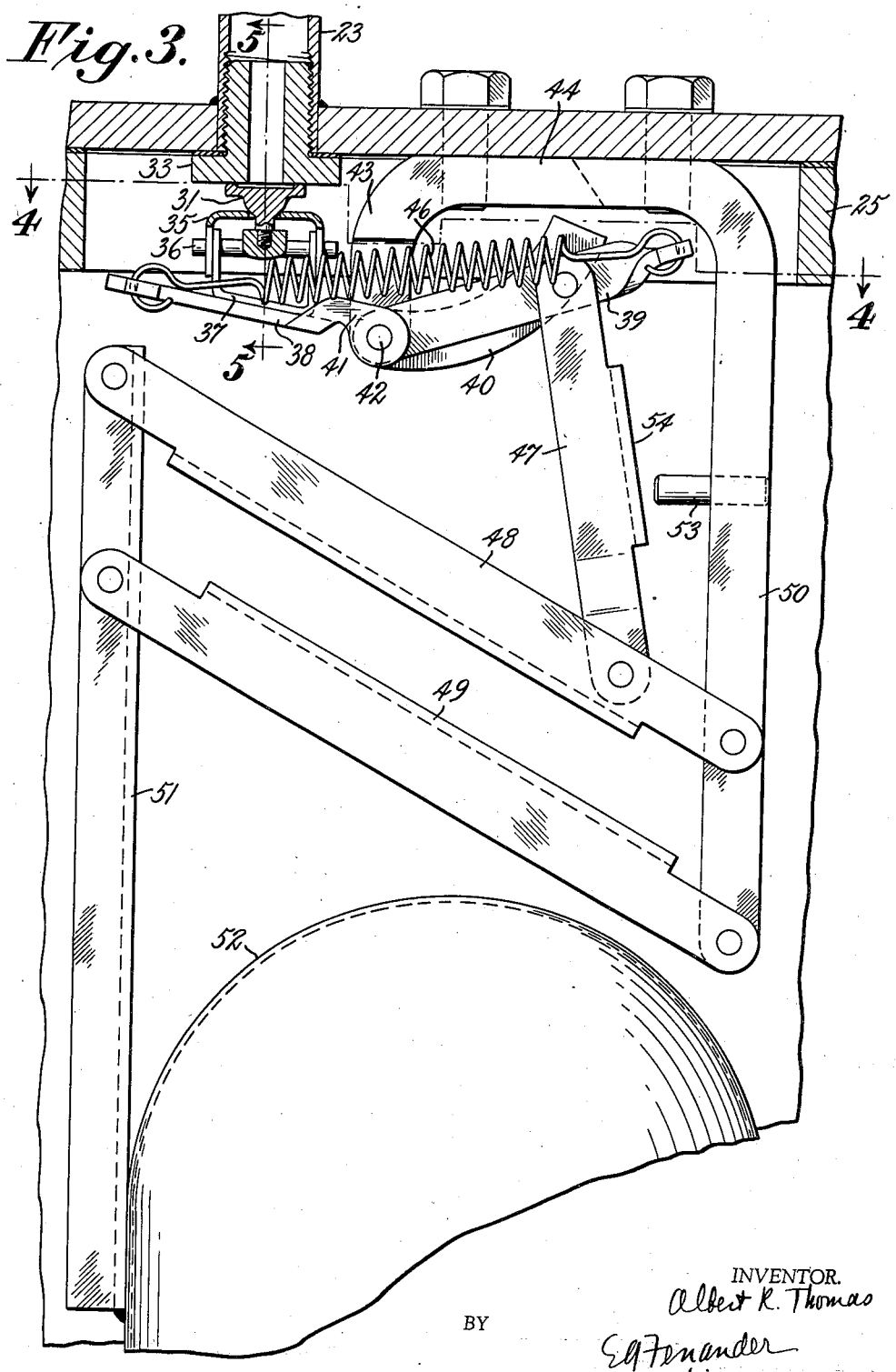
Figure 4:
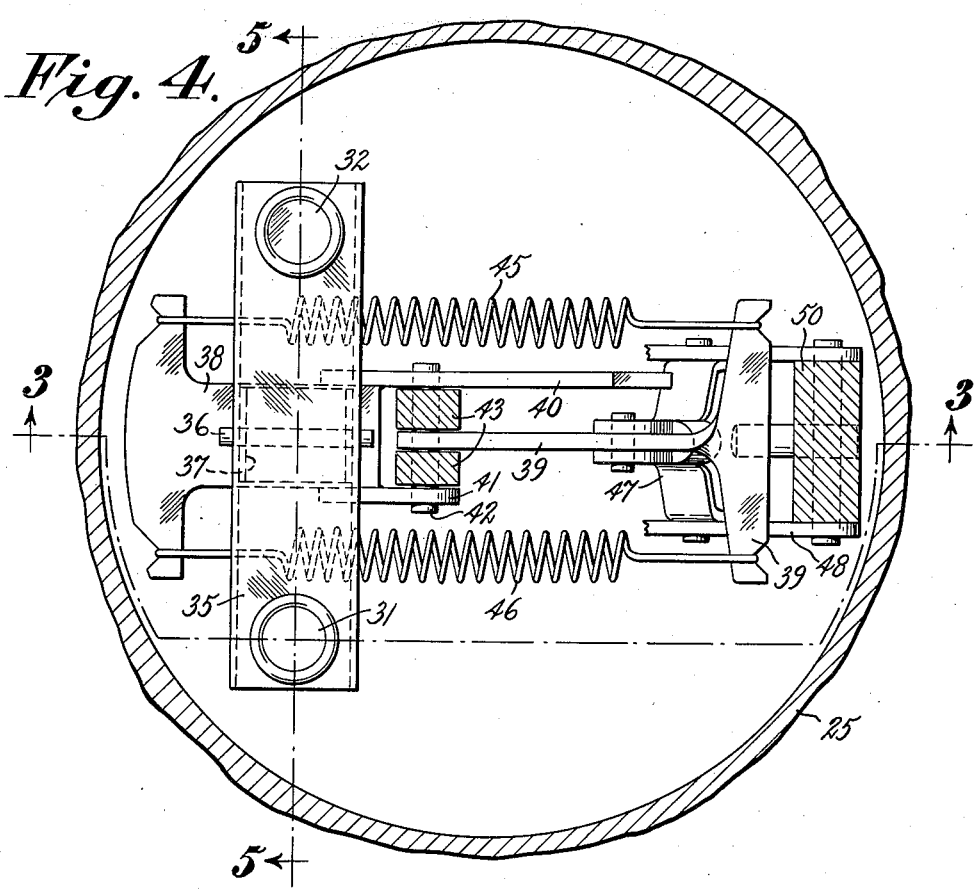
Figure 5:
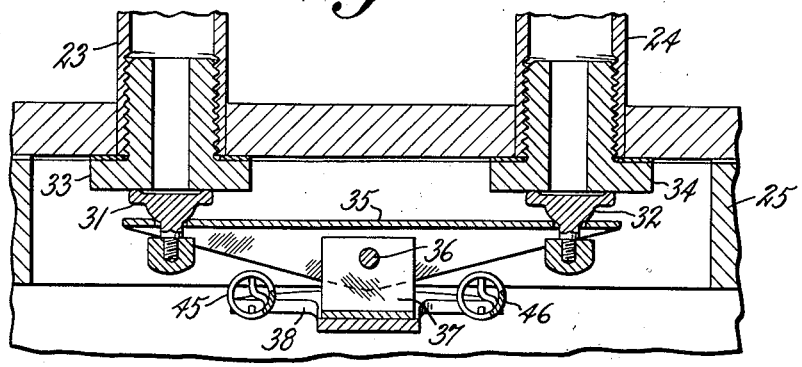

In the drawings, Fig. 1 diagrammatically illustrates a heat transfer system embodying my invention; Fig. 2 is an enlarged vertical section taken on line 2—2 of Fig. 1 to illustrate more clearly parts of the heat transfer system; Fig. 3 is an enlarged sectional view taken on lines 3—3 of Figs. 2 and 4; Fig. 4 is a sectional view taken on line 4—4 of Fig. 3; Fig. 5 is a sectional view taken on lines 5—5 of Figs. 3 and 4; Fig. 6 is a fragmentary vertical section illustrating a modification of a part of the system shown in Fig. 1; Fig. 7 is a view similar to Fig. 6 illustrating a further modification of the system shown in Fig. 1; Fig. 8 is a sectional view taken on line 8—8 of Fig. 7; and Fig. 9 is a fragmentary sectional view taken on line 9—9 of Fig. 8.

Referring to Fig. 1, I have shown my invention in connection with a cooling unit 10 of refrigeration apparatus of a uniform pressure absorption type containing a pressure equalizing gas and like that described in my application Serial No. 107,852, filed October 27, 1936. It is to be understood, however, that the particular refrigeration apparatus described in the application referred to is merely illustrative and that other types of refrigeration apparatus may be employed. The cooling unit 10 constitutes a source of refrigeration and comprises an outer shell which is embedded in heat insulating material 11. A liquid refrigerant, such as ammonia, is introduced into the upper part of the cooling unit 10 through a conduit 12. An inert gas, such as hydrogen, enters the upper part of the cooling unit from the upper end of a cylinder 13 disposed within the shell. The liquid ammonia evaporates and diffuses into the hydrogen with consequent absorption of heat from the surroundings to produce a refrigerating effect. This refrigerating effect is utilized to cool and liquefy a volatile fluid flowing through a coil 14 which is arranged about the cylinder 13 and over the successive turns of which the liquid ammonia descends in sheet-like form.

The resulting gas mixture of ammonia and hydrogen flows from the cooling unit 10 to an absorber in which the ammonia is absorbed into a liquid absorbent such as water. The inert hydrogen gas is returned to the cylinder 13 and the enriched absorption liquid is conducted to a generator. By heating the generator the ammonia is expelled from enriched absorption solution, liquefied in a condenser, and then returned to the cooling unit 10 through conduit 12 to complete the refrigerating cycle. The weakened absorption solution from which ammonia has been expelled is conducted from the generator to the absorber to absorb ammonia gas. In order to simplify the drawings, the absorber, generator, and condenser of the refrigeration apparatus associated with the cooling unit 10 have not been shown, their illustration not being necessary for an understanding of my invention.

The coil 14, which is arranged within and in thermal relation with the cooling unit 10 of the refrigeration apparatus just described, constitutes the condenser of a heat transfer system forming the subject matter of my present invention. The coil 14, which will hereinafter be referred to as a condenser, is disposed below an evaporator 15 of a flooded type which is located in a thermally insulated storage space 16 that is to be maintained at a desired low temperature. The evaporator 15 includes a receiver 17 and a looped coil 18 which is provided with heat transfer fins 19 and is connected to the receiver 17.

The condenser 14 and evaporator 15 form part of a closed fluid circuit which contains a suitable volatile fluid that evaporates within the evaporator 15 and takes up heat thereby producing cold. The vapor flows from the evaporator 15 through a conduit 20 into the condenser 14, and the vapor is cooled and condensed by the cooling unit 10.

In accordance with my invention, in order that cooling may be constantly and continuously produced in the storage space 16, I provide structure for returning condensed fluid from the condenser 14 to the evaporator 15 which is disposed at a higher level. The structure for returning liquid to the evaporator comprises a vessel 21 which is connected by a conduit 22 to the lower end of the condenser 14 for accumulating and collecting condensed fluid formed in the latter. The upper and lower parts of the vessel 21 are connected by conduits 23 and 24, respectively, to the upper part of a second vessel 25. The lower end of the vessel 25 is in turn connected by a rising conduit 26 to the receiver 17 for returning liquid to the evaporator 15. The vessels 21 and 25 and connecting conduits 23 and 24 are embedded in insulation 27, and the upper end of a smaller vessel or part 28 disposed outside the insulation is connected by a conduit 29 to the side of the vessel 25. The conduit 26 is preferably provided with a heat insulating covering 30 to prevent excessive evaporation of liquid in this conduit.

The lower ends of the conduits 23 and 24 are adapted to be intermittently closed and opened by valves 31 and 32 to control the flow of liquid from vessel 21 into the vessel 25. Referring more particularly to Figs. 3 to 5 inclusive, the valves 31 and 32 are adapted to bear against valve seats 33 and 34 formed at the lower ends of the conduits 23 and 24. The valves 31 and 32 are mounted on the ends of a cross-plate 35 which is connected intermediate its ends by a pin 36 to a bracket 37.

The bracket 37 is secured to an arm 38 which cooperates with an arm 39 for moving the valves 31 and 32 to and from their closed position. The inner end of the arm 38 is provided with spaced side members 40 and 41 which are pivotally connected by a pin 42 to the short downwardly extending arm 43 of an inverted U-shaped bracket 44 secured to the upper end of the vessel 25. The side member 40 is considerably longer than the side member 41 and is curved upwardly and contacts the upper end of the vessel 25 to limit the extent of movement of the valves 31 and 32 when they are moved to their open position. The inner end of the arm 39 is also pivotally connected by the pin 42 to the short arm 43 of the bracket 44 and is offset with respect to the side members 40 and 41.

The outer ends of the arms 38 and 39 are connected by a pair of coil springs 45 and 46 to provide a snap-acting toggle mechanism. To the arm 39 is pivotally connected the upper end of a lever 47 having a lower forked end which is pivotally connected to the sides of a lever 48 which is U-shaped in section, as shown in Fig. 2. An end of the lever 48, and also an end of a parallel lever 49 disposed below the lever 48, are connected to the downwardly extending longer arm 50 of the bracket 44. The opposite ends of the levers 48 and 49 are pivotally connected to the upper end of a vertical lever 51 which is secured at its lower end to a float 52. The longer arm 50 of the bracket 44 is provided with a pin 53 which is in the path of movement of the outer end of the lever 39 to limit downward movement of the latter when the valves 31 and 32 are moved to their open position. The upper horizontal portion of bracket 44 is in the path of movement of the outer end of lever 39 and limits the upward movement of lever 39 and float 52 when the valves 31 and 32 are moved to their closed position.

During operation, vapor formed in the evaporator 15 flows through conduit 20 into the condenser 14 in which the vapor is condensed. The condensed fluid flows from the condenser 14 through conduit 22 into the accumulation vessel 21. When the liquid level in the vessel 25 is a definite distance below a predetermined level, the valves 31 and 32 are in their open position and liquid flows through conduit 24 into the vessel 25. When the liquid in the vessel 25 reaches the predetermined level, the float 52 has moved upward sufficiently to cause the arm 39 to move past the dead-center position of the arms 38 and 39, whereby the coil springs 45 and 46 move the valves to their closed position. With the valves 31 and 32 in their closed position, the predetermined level of liquid in the vessel 25 is such that the part 28 is filled with liquid, as shown in Fig. 2. The liquid introduced into the vessel 25 forms a liquid column in the lower part of this vessel and the lower part of the rising conduit 26. Liquid in the part 28 evaporates due to heat transfer from the surrounding warmer air which may be at ordinary room temperature, and the vapor thus formed in the part 28 is trapped or confined in the upper part of the vessel 25. The vapor pressure in the upper part of vessel 25 continues to increase due to evaporation of liquid in the part 28, and, when this vapor pressure is sufficiently great, liquid is forced upward in the conduit 26 and into the receiver 17 of the evaporator 15.

When the quantity of liquid leaving the vessel 25 is such that the liquid level falls the definite distance below the predetermined liquid level, the arm 39 has been moved downward past the dead-center position of the arms 38 and 39 by the float 52, whereby the coil springs 45 and 46 move the valves 31 and 32 to their open position. The vapor in the part 28 and upper part of the vessel 25 flows through conduit 23 into the upper part of the vessel 21 to equalize the vapor pressures in the vessels 21 and 25, and liquid will then flow through conduit 24 into the vessel 25 to replace condensed fluid that has evaporated in the part 28 and liquid that has been returned to the evaporator 15. When the liquid in the vessel 25 has again reached the predetermined level the valves 31 and 32 are moved to their closed position, and a confined body of vapor is again formed in the upper part of the vessel 25, due to evaporation of condenser fluid in the part 28, to force liquid through conduit 26 and into the receiver 17.

The heat transfer system just described is substantially a uniform pressure system and operates continuously to transfer heat from the storage space 16 to the cooling unit 10 and thereby maintain the former at a desired low temperature. While fluid is constantly vaporizing in the evaporator 15 and condensing in the condenser 14 due to the cooling effected by the cooling unit 10, the mechanism within the vessel 25 operates automatically to return liquid intermittently to the evaporator 15 due to evaporation of liquid in the part 28.

By embedding the vessels 21 and 25 and conduits 23 and 24 in the insulation 27 and providing the part 28 which forms a chamber in communication with the upper part of the vessel 25 and outside the insulation, liquid in the vessel 25 is maintained at a low temperature and evaporation thereof is substantially prevented. Each time that liquid flows into the vessel 25 and part 28, therefore, only a relatively small quantity of liquid in the part 28 is heated due to heat transfer from surrounding warmer air to form a body of vapor in the vessel 25 which acts against the liquid column formed in the latter and the rising conduit 26. Not only is the liquid in the vessel 25 maintained below its evaporating temperature with the construction just described, but in addition the accumulation of frost on the vessels 21 and 25 is avoided by embedding them in insulation. The conduit 22 is preferably provided with a heat insulating covering to prevent evaporation of liquid in this conduit. If desired, the return vapor conduit 20 may also be insulated so that the vaporized fluid enters the condenser 14 substantially at the temperature at which it leaves the evaporator 15.

In the modification shown in Fig. 6, the evaporation of liquid is effected in a vertical conduit 55 instead of a small vessel or part 28. The upper and lower ends of conduit 55 are connected by conduits 56 and 57, respectively, to the upper and lower parts of the vessel 25. In this modification liquid entering the vessel 25 flows from the lower part thereof through conduit 57 into vertical conduit 55 and assumes the same level therein as liquid in the vessel 25. When the valves 31 and 32 are moved to their closed position, the liquid in conduit 55 evaporates due to heat transfer from surrounding warmer air, and the vapor thus formed flows through conduit 56 into the upper part of the vessel 25. The vapor pressure in the upper part of the vessel 25 increases due to evaporation of liquid in conduit 55 and, when this vapor pressure is sufficiently great, liquid is forced upwardly into the evaporator 15. In the embodiment shown in Fig. 2 and the modification just described, the part 28 and conduit 55 both form small auxiliary chambers communicating with the upper part of the main chamber formed by the vessel 25, whereby liquid evaporating in the auxiliary chamber outside the insulation 27 enters the upper part of the main chamber to form a confined body of vapor capable of returning liquid to the evaporator 15.

During the intervals of time when the valves 31 and 32 are in their open position and liquid flows from the accumulation vessel 21 into the vessel 25, liquid in the auxiliary chamber is constantly evaporating. In order that this vapor can be effectively utilized, means may be provided to shut off the conduit or chamber outside the insulation 27 during the periods when liquid enters the vessel 25. Such a modification is shown in Figs. 7 to 9 inclusive with parts similar to those shown in Figs. 3 to 5 designated by the same reference numerals.

In Fig. 7 a vertical conduit 58 disposed outside the insulation is connected at its lower end to the lower part of the vessel 25 and at its upper end to the closed upper end of the vessel. The outer end of the upwardly curved side member 40 of the arm 38 is provided with a valve 59 which is adapted to bear against a valve seat 60 formed at the upper end of conduit 58. With this arrangement the valve 59 is in its open position when the valves 31 and 32 are in their closed position, as shown in Fig. 8; and, conversely, the valve 59 is in its closed position when the valves 31 and 32 are in their open position, With the valves 31 and 32 and valve 60 in the positions shown in Fig. 8, liquid is evaporated in conduit 58 due to heat transfer from surrounding warmer air and the vapor formed flows into the upper part of the vessel 25 from the upper end of the conduit. When the vapor pressure in the upper part of the vessel 25 is sufficiently great, liquid is forced upward into the evaporator 15. When the liquid falls the definite distance below the predetermined liquid level, the valves 31 and 32 are moved to their open position, as described above. Simultaneously with the opening of the valves 31 and 32, the valve 59 is moved to its closed position. The vapor in the vessel 25 flows through conduit 23 into the vessel 21. Since the valve 59 is in its closed position, vapor formed in conduit 58 is prevented from entering the upper part of the vessel 25. The vapor in conduit 58 is trapped and, with continued evaporation of liquid the vapor forces liquid in conduit 58 back into vessel 25. Due to the fact that liquid in conduit 58 is forced back into vessel 25, the amount of vapor formed and passing into vessel 25 is very small during the periods when liquid flows from vessel 21 into vessel 25.

When the liquid reaches a predetermined level in vessel 25, valve 59 is opened simultaneously with the closing of valves 31 and 32. The vapor trapped in conduit 58 immediately passes into the upper end of the vessel 25. Liquid then flows into conduit 58 at the lower end thereof to the same level as in vessel 25. Inasmuch as conduit 58 is free of liquid during the periods when liquid flows from vessel 21 into vessel 25, the temperature of this conduit is increased by being exposed to the surrounding warmer air. When valve 59 opens, therefore, the initial evaporation of liquid is very rapid and a rapid rise in pressure results, the vapor pressure eventually becoming sufficiently great to force liquid upwardly into the evaporator 15.

By providing the conduit 58 and valve 59 to close the upper end of this conduit during the periods when liquid flows into vessel 25, both the efficiency of the apparatus and the rate at which liquid is transferred from the vessel 25 to the evaporator 15 are increased considerably. The particular arrangement shown in Figs. 7 to 9 inclusive minimizes evaporation of liquid during the periods when liquid enters the vessel 25. By forming the lower part of conduit 58 into a vertical spiral coil the area of surface exposed to the warmer surrounding air is increased. In this modification a pin 62 is in the path of movement of the outer end of lever 39 and limits the upward movement of lever 39 and float 52 when valves 31 and 32 are moved to their closed position.

Although I have shown and described particular embodiments of my invention, it will be apparent to those skilled in the art that modifications may be made without departing from the spirit and scope of the invention, as pointed out in the following claims.

What is claimed is:

1. A heat transfer system containing a volatile fluid and including an evaporator, a condenser disposed below said evaporator, a vessel having the upper part thereof communicating with said condenser to receive condensed fluid therefrom and the lower part thereof communicating with said evaporator for returning condensed fluid thereto, insulation disposed about said vessel, a conduit disposed outside said insulation and having the upper and lower ends thereof communicating with the upper and lower parts of said vessel, said vessel and said part being so constructed and arranged that the condensed fluid entering said conduit is capable of evaporating due to heating thereof to form vapor in the upper part of said vessel which is capable of acting against a liquid column of condensed fluid for returning liquid to said evaporator.

2. A heat transfer system containing a volatile fluid and including an evaporator, a condenser disposed below said evaporator, structure for returning condensed fluid from said condenser to said evaporator and forming a main chamber and an auxiliary chamber adapted to receive liquid from said condenser, a rising conduit for conducting liquid from said main chamber to said evaporator, a valve, and a float within said main chamber operatively connected to said valve for controlling the flow of liquid into said main chamber and said auxiliary chamber, said structure being constructed and arranged to permit evaporation of liquid in said auxiliary chamber and form a body of vapor in said main chamber when said valve is closed.

3. A heat transfer system containing a volatile fluid and comprising an evaporator, a condenser disposed below said evaporator, the volatile fluid evaporating in said evaporator and condensing in said condenser, structure forming a main chamber and an auxiliary chamber for receiving liquid from said condenser, the upper and lower parts of said auxiliary chamber being in communication with the upper and lower parts of said main chamber, a rising conduit for conducting liquid from said main chamber to said evaporator, said structure being constructed and arranged to permit evaporation of liquid in said auxiliary chamber to form a body of vapor in the upper part of said main chamber, means for controlling the flow of liquid into said main chamber and auxiliary chamber, and means for controlling the flow of vapor from said auxiliary chamber into said main chamber.

4. A heat transfer system containing a volatile fluid and comprising an evaporator, a condenser disposed below said evaporator, the volatile fluid evaporating in said evaporator and condensing in said condenser, structure forming a main chamber and an auxiliary chamber for receiving liquid from said condenser, the upper and lower parts of said auxiliary chamber being connected to the upper and lower parts of said main chamber, a rising conduit for conducting liquid from said main chamber to said evaporator, the heating of liquid in said auxiliary chamber forming a body of the vapor in the upper part of said main chamber, means for controlling flow of liquid into said main chamber and said auxiliary chamber, and means for controlling flow of vapor from said auxiliary chamber into the upper part of said main chamber, said two last-mentioned means being so constructed and arranged that vapor formed in said auxiliary chamber is trapped therein when liquid flows into said main chamber and is permitted to flow into said main chamber when the flow of liquid into the latter is shut off.

5. A heat transfer system containing a volatile fluid and including an evaporator, a condenser disposed below said evaporator, the volatile fluid evaporating in said evaporator and condensing in said condenser, structure for returning liquid from said condenser to said evaporator and forming a main chamber and an auxiliary chamber communicating with said main chamber, said main chamber being embedded in insulation, a rising conduit for conducting condensed fluid from said main chamber to said evaporator, a valve, and a float within said main chamber operatively connected to said valve for controlling the flow of liquid into said main chamber and said auxiliary chamber, said structure being constructed and arranged to permit evaporation of liquid in said auxiliary chamber and form a body of vapor in said main chamber when said valve is closed.

6. A heat transfer system containing a volatile fluid and including an evaporator, a condenser connected to said evaporator and disposed below the latter, the volatile fluid evaporating in said evaporator and condensing in said condenser, a vessel connected to the lower part of said condenser and adapted to receive liquid formed in the latter, a second vessel disposed below said first vessel, separate conduits connecting said second vessel and the upper and lower parts, respectively, of said first vessel, said conduit connecting the lower part of said first vessel and said second vessel being arranged to conduct liquid from the former into the latter, a rising conduit connecting said second vessel and said evaporator, a part communicating with said second vessel adapted to receive liquid introduced into said second vessel, valves at the lower ends of said conduits connecting said first and second vessels, and a float within said second vessel operatively connected to said valves, said second vessel and said part being constructed and arranged to permit evaporation of liquid in said part to form a body of vapor in said second vessel.

7. A heating system as defined in claim 6 in which said part comprises a conduit having the upper and lower ends thereof communicating with the upper and lower regions of said main chamber, and a valve at the upper end of said conduit, said last-mentioned valve being operatively connected to said float so that it is open when said valves at the lower ends of said first and second conduits are closed and it is closed when said valves at the lower ends of said first and second conduits are open.

8. A heat transfer system containing a volatile fluid and including an evaporator, a condenser disposed below said evaporator, structure forming a main chamber for receiving liquid formed in said condenser, a rising conduit for conducting liquid from said main chamber to said evaporator, insulation disposed about said main chamber, a part forming an auxiliary chamber disposed outside said insulation and communicating with said main chamber, a valve, a float, snap-acting toggle mechanism operatively connecting said float to said valve for controlling flow of liquid into said main chamber and said auxiliary chamber, said valve in its closed position providing a confined space in said main chamber and said main chamber and auxiliary chamber being constructed and arranged to permit evaporation of liquid in said auxiliary chamber to form a body of vapor in said confined space which acts against liquid in said rising conduit portion and lifts liquid upwardly into said evaporator.

9. In a heat transfer system containing a fluid and having a condensation portion at a lower level and a vaporization portion at a higher level, structure forming a main chamber and an auxiliary chamber communicating with the main chamber and adapted to receive the fluid in the system in a liquid state, a rising conduit for conducting liquid from the lower part of said main chamber to the higher level, means to permit intermittent flow of liquid into said main chamber during periods alternating with periods during which vapor formed in said auxiliary chamber due to evaporation of liquid therein flows into the upper part of said main chamber and acts against liquid in the latter to force liquid upwardly through said rising conduit to the higher level, and means to prevent vapor formed in said auxiliary chamber from entering said main chamber during the periods when liquid flows into said main chamber.

10. A method of heat transfer which includes simultaneously vaporizing liquid fluid in a place of vaporization at an upper elevation, condensing vaporized fluid in a place of condensation at a lower elevation, and raising condensate between said elevations by conducting a part of the condensate to a thermally exposed place and a part to a thermally insulated place, conducting vapor from the exposed place to the insulated place, and alternately trapping and releasing vapor above a surface level of liquid in said insulated place to exert pulsating force thereon.

11. A method as set forth in claim 10 in which condensate is conducted to said exposed place only after a certain amount has been conducted to said insulated place.

12. A method as set forth in claim 10 in which condensate is conducted to said thermally exposed place by overflow from said insulated place.

13. A heat transfer system including a circuit for heat transfer fluid having a place of vaporization at an upper elevation, a place of condensation at a lower elevation, means for raising liquid between said elevations including an alternate liquid and vapor accumulator having means for intermittently releasing vapor therefrom to cause rise and fall of liquid surface level below the vapor therein, and a heated chamber connected to receive condensed liquid and deliver vapor to said accumulator.

14. A system as set forth in claim 13 in which said accumulator is thermally insulated and said chamber is heated by atmosphere.

15. A system as set forth in claim 13 in which said chamber receives condensed liquid by overflow from said accumulator.

16. A system as set forth in claim 13 in which said chamber receives condensed liquid and delivers vapor by way of a single conduit.

17. A system as set forth in claim 13 in which said chamber is connected to receive condensed liquid only when said accumulator contains a certain amount of liquid.

ALBERT R. THOMAS.